(12) United States Patent
Obdrzalek et al.

(10) Patent No.: US 8,306,332 B2
(45) Date of Patent: Nov. 6, 2012

(54) IMAGE SEARCH METHOD AND DEVICE

(75) Inventors: Stepan Obdrzalek, Prague (CZ); Jiri Matas, Roztoky u Prahy (CZ); Katsuhiro Sakai, Brussels (BE)

(73) Assignees: Toyota Jidosha Kabushiki Kaisha, Toyota-shi (JP); Czech Technical University in Prague, Prague (CZ)

( * ) Notice: Subject to any disclaimer, the term of this patent is extended or adjusted under 35 U.S.C. 154(b) by 1018 days.

(21) Appl. No.: 12/065,437

(22) PCT Filed: Aug. 31, 2006

(86) PCT No.: PCT/JP2006/317692
§ 371 (c)(1),
(2), (4) Date: Feb. 29, 2008

(87) PCT Pub. No.: WO2007/026951
PCT Pub. Date: Mar. 8, 2007

(65) Prior Publication Data
US 2009/0279792 A1    Nov. 12, 2009

(30) Foreign Application Priority Data
Aug. 31, 2005    (JP) ................. 2005-251665

(51) Int. Cl.
*G06K 9/46* (2006.01)
*G06K 9/00* (2006.01)
*G06K 9/62* (2006.01)

(52) U.S. Cl. ........ 382/190; 382/115; 382/128; 382/154; 382/209; 382/224

(58) Field of Classification Search .............. 382/224, 382/115, 128, 190, 154, 209
See application file for complete search history.

(56) References Cited

U.S. PATENT DOCUMENTS
5,644,651 A * 7/1997 Cox et al. .............. 382/154
(Continued)

FOREIGN PATENT DOCUMENTS
JP        11-312248        11/1999
(Continued)

OTHER PUBLICATIONS
Extended European Search Report issued Jan. 3, 2011, in Application No./Patent No. 06797568.o—1224 / 1930852 PCT/JP2006317692.

(Continued)

*Primary Examiner* — Kathleen Y Dulaney
(74) *Attorney, Agent, or Firm* — Oblon, Spivak, McClelland, Maier & Neustadt, L.L.P.

(57) ABSTRACT

An image search method that is robust and fast (with computational complexity of logarithmic order relative to the number of models). The image search includes extracting a plurality of regions from one or more model images and normalizing the regions as standard regions; setting a specific region in each normalized standard region and classifying the plurality of standard regions under two or more subsets on the basis of a feature of the specific region; iteratively performing an operation of setting another specific region at a location different from that of the aforementioned specific region in each standard region classified in each subset and classifying the plurality of standard regions under still more subsets on the basis of a feature of the other specific region; and outputting the locations of the specific regions in the standard regions in the respective classifications and the features of the specific regions in the classifications.

16 Claims, 9 Drawing Sheets

U.S. PATENT DOCUMENTS

| | | | | |
|---|---|---|---|---|
| 7,756,341 | B2* | 7/2010 | Perronnin | 382/224 |
| 2004/0101199 | A1* | 5/2004 | Lee et al. | 382/209 |

FOREIGN PATENT DOCUMENTS

| | | |
|---|---|---|
| JP | 2000-207420 | 7/2000 |
| JP | 2004-062804 | 2/2004 |

OTHER PUBLICATIONS

Vincent LePetit, et al., "Randomized Trees for Real-Time Keypoint Recognition", Computer Vision and Pattern Recognition, vol. 2, IEEE Computer Society Conference, XP010817532, Jun. 20, 2005, pp. 775-781.

Vincent LePetit, et al., "Towards Recognizing Feature Points using Classification Trees", EPFL Technical Reports, No. IC/2004/74, XP002602745, Sep. 15, 2004, pp. 1-13.

"Chapter 9: Object Recognition"In: Yali Amit: "2D Object Detection and Recognition", MIT, XP002602744, 2002, pp. 181-214 (plus cover page).

Douglas Kozlay, "Feature Extraction in an Optical Character Recognition Machine", IEEE Transactions on Computers, XP001482879, Sep. 1970, 6 pages.

Richard G. Casey, et al., "Decision Tree Design Using a Probabilistic Model", IEEE Transactions on Information Theory, (US LNKD-DOI: 10.1109/TIT.1984.1056834), vol. IT-30, No. 1, XP002078009, Jan. 1, 1984, pp. 93-99.

Raphaël Marée, et al., "A Generic Approach for Image Classification Based on Decision Tree Ensembles and Local Sub-Windows", Proc. of the 6th Asian Conf. on Computer Vision, vol. 2, XP002602743, 2004, pp. 860-865.

Etienne Grosmann, "AdaTree: boosting a weak classifier into a decision tree", XP010761882, Jun. 27, 2004, 7 pages.

Yoshio Yanagihara, et al., "A Method for Generating Optimum Decision Tree for Image Retrieval", Systems and Computers in Japan, vol. 17, No. 8, XP000038089, Aug. 1, 1986, pp. 1-10.

Štěpán Obdržálek, et al., "Object Recognition using Local Affine Frames on Distinguished Regions", Proc. British Machine Vision Conference, vol. 1, XP002602746, 2002, pp. 113-122.

Sreerama K. Murthy, "Automatic Construction of Decision Trees from Data: A Multi-Disciplinary Survey", Journal of Data Mining and Knowledge Discovery, (LNKD-DOI: 10.1032/A:1009744630224), vol. 2, No. 4, XP001099104, Jan. 1, 1998, pp. 345-389.

J. R. Quinlan, "Unknown Attribute Values in Induction", [online], Proceedings of the sixth International Machine Learning Workshop, (Retrieved from the Internet: URL:http://citeseerx.ist.psu.edu/viewdoc/summary?doi=10.1.1.35.69&rep=rep1type=pdf>), [retrieved on Sep. 30, 2010], XP002602747, 1989.

Zhuowen TU, "Probabilistic Boosting-Tree: Learning Discriminative Models for Classification, recognition and Clustering", Computer Vision, ICCV, Tenth IEEE International Conference, (IEEE LNKD-DOI:10.1109/ICCV.2005.194), vol. 2, XP010857003, Oct. 17, 2005, pp. 1589-1596.

Štěpán Obdržálek, et al., "Sub-linear Indexing for Large Scale Object Recognition", Proceedings of the British Machine Vision Conference, XP002602748, Sep. 5-8, 2005, pp. 1-10.

David G. Lowe, "Distinctive Image Features from Scale-Invariant Keypoints", International Journal of Computer Vision, vol. 60, No. 2, 2004, pp. 91-110.

J. Matas, et al., "Robust Wide Baseline Stereo from Maximally Stable Extremal Regions", BMVC, 2002, pp. 384-393.

* cited by examiner

IMAGE SEARCH METHOD AND DEVICE

FIELD OF THE INVENTION

The present invention relates to an image search method and apparatus for construction of a database permitting a fast image search, and for the fast search itself.

DISCUSSION OF THE BACKGROUND

Calculation of small regions in correspondence relationship between a plurality of images is a significant issue for various image processing applications such as object recognition, 3D information reconstruction, and image searching. An image recognition means configured to extract local regions in images in a normalized state invariant to affine transformation and rotation transformation (which will be referred to hereinafter as affine-invariant regions) and to use correspondence relationship between the affine-invariant regions has the advantage that a change of a viewpoint relative to a recognition object can be geometrically modeled. Since it utilizes the local affine-invariant regions, it also has the advantage of high adaptability for partial hiding of the recognition object.

[Non-patent Document 1] D. G. Lowe "Distinctive image features from scale-invariant keypoints" Int. J. Compt. Vision, 60(2): 91-110, 2004

[Non-patent Document 2] J. Mates, O. Chum, M. Urban, and T. Pajdla "Robust Wide Baseline Stereo from Extremal Regions" BMVC02, 2002

These techniques are generally implemented by the following three-step processing (cf. FIG. 8). (1) To extract affine-invariant regions from one or more model images and a search object image (sample image). (2) To calculate correspondences of the extracted affine-invariant regions on the basis of local information. (3) To examine the correspondences calculated in the above step (2), using global information.

SUMMARY OF THE INVENTION

Robustness and execution speed are also significant issues herein in the calculation of correspondences between the affine-invariant regions in the above step (2). For example, where a plurality of objects are recognized, and when a method adopted is to sequentially compare coincidence between affine-invariant regions extracted from a plurality of model images and affine-invariant regions extracted from a search object image as shown in FIG. 9, the computational load also linearly increases with increase in the number of model images (i.e., the number of affine-invariant regions extracted therefrom), and it is fatal to real-time applications. Therefore, an object of the present invention is to provide an image search method and apparatus being robust and fast (with computational complexity of logarithmic order relative to the number of models).

In [Non-patent Document 1] above, an image histogram is used as an index to find correspondences between the affine-invariant regions and thereby implement comparison between two images. However, since the comparison is made including the background part other than parts desired as search objects, it is infeasible to find accurate correspondences between affine-invariant regions, if the background part exists at a large ratio.

An image search method in one aspect includes: a normalization step of extracting a plurality of regions from one or more model images and normalizing the regions as standard regions; a classification step of setting a specific region in each normalized standard region and classifying the plurality of standard regions under two or more subsets on the basis of a feature of the specific region; a recursive classification step of iteratively performing an operation of setting an other specific region at a location different from that of the aforementioned specific region in each standard region classified in each subset and classifying the plurality of standard regions under still more subsets on the basis of a feature of the other specific region; and an output step of outputting the locations of the specific regions in the standard regions in the respective classifications and the features of the specific regions in the classifications.

The features of the specific regions used in the classifications may be luminance information about the specific regions.

The normalization step may include dividing a standard region into a background part and a search part. And when the location of the specific region in the classification step or in the recursive classification step is in the background part, the specific region may be included in all the subsets in the classification.

The normalization step may include normalizing a region possessing such a property that a shape can be normalized regardless of an affine transformation thereof, as a standard region.

The normalization step may include normalizing a region possessing such a property that a shape can be normalized regardless of a rotation transformation thereof, as a standard region.

The image search method may further include: an input step of inputting a predetermined region resulting from normalization of a region extracted from a search object, as a detection object; and a search step of performing a search to determine to which terminal subset the predetermined region belongs, based on an output result in the output step, and thereby finding a correspondence between the predetermined region and a subset of the standard regions.

The search step may include finding the correspondence between the predetermined region and the subset of the standard regions, in consideration of a location deviation from the standard region in the normalization for the predetermined region in the input step.

An image search apparatus in one aspect includes: normalization means for extracting a plurality of regions from one or more model images and normalizing the regions as standard regions; classification means for setting a specific region in each normalized standard region and classifying the plurality of standard regions under two or more subsets on the basis of a feature of the specific region; recursive classification means for iteratively performing an operation of setting an other specific region at a location different from that of the aforementioned specific region in each standard region classified in each subset and classifying the plurality of standard regions under still more subsets on the basis of a feature of the other specific region; and output means for outputting the locations of the specific regions in the standard regions in the respective classifications and the features of the specific regions in the classifications.

The features of the specific regions used in the classifications may be luminance information about the specific regions.

The normalization means may include a standard region into a background part and a search part. And wherein when the location of the specific region in the classification by the classification means or in the recursive classification by the recursive classification means is in the background part, the specific region may be included in all the subsets in the classification.

In the normalization by the normalization means a region possessing such a property that a shape can be normalized regardless of an affine transformation thereof, may be normalized as a standard region.

In the normalization by the normalization means a region possessing such a property that a shape can be normalized regardless of a rotation transformation thereof, may be normalized as a standard region.

The image search apparatus may further include: input means for inputting a predetermined region resulting from normalization of a region extracted from a search object, as a detection object; and search means for performing a search to determine to which terminal subset the predetermined region belongs, based on an output result by the output means, and thereby finding a correspondence between the predetermined region and a subset of the standard regions.

In the search by the search means the correspondence between the predetermined region and the subset of the standard regions may be found in consideration of a location deviation from the standard region in the normalization for the predetermined region in the input step.

DETAILED DESCRIPTION OF THE PREFERRED EMBODIMENTS

Figure 1:
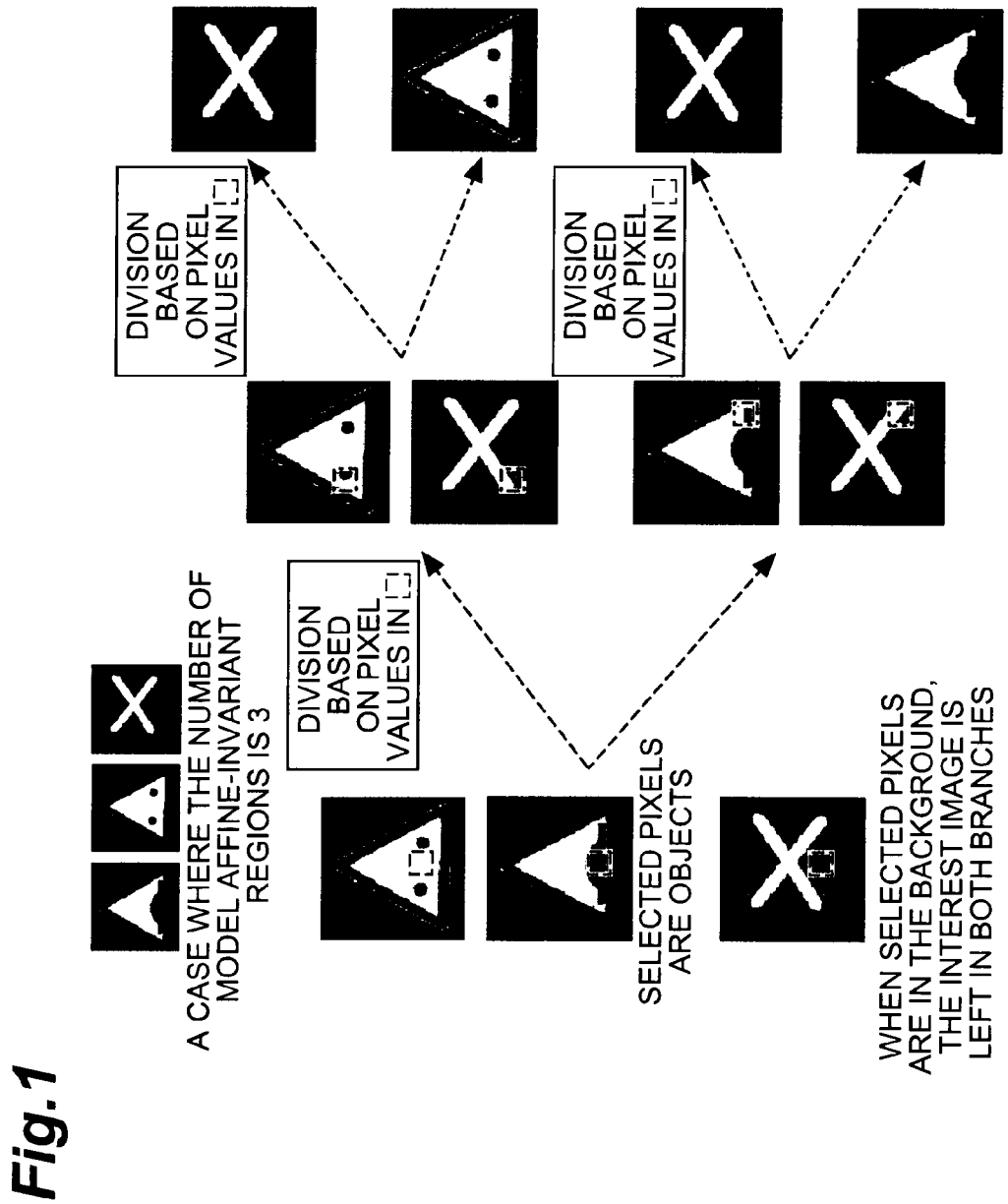
FIG. 1 is an explanatory drawing showing a schematic process of learning in an image search method and apparatus of the present invention.

An image search apparatus of the present invention has an input unit for inputting an object image as a search object and model images to be used as a database for comparison with the object image; a calculation unit for carrying out calculation to determine an affine-invariant region and others for an input image, and comparison for a search; an output unit for outputting a constructed database or search result; a memory unit for storing programs necessary for the calculation, intermediate calculation result, the constructed database, etc.; and so on.

The input unit can be a camera, a scanner, or an input/output drive for inputting an image as data. The calculation unit can be a CPU or GPU•ROM•RAM, or the like. The output unit can be a monitor display, a printer, or an input/output drive. The memory unit can be a hard disk, a RAM, or one of other storage devices.

An image search method (database construction method) in the present embodiment will be summarized below. The following description will concern an example where road signs are dealt with as images. It is also noted that the following will describe the present invention as a correspondence calculation technique of affine-invariant regions but the scope of application of the invention is not limited to the affine-invariant regions. The present invention is widely applicable to correspondence calculations of images even in the other techniques, such as the raster scan, as long as the images dealt with are images normalized in fixed size.

First, let us consider a comparison technique of affine-invariant regions capable of eliminating influence of the background part. It is assumed herein that the background part is unknown for an affine-invariant region extracted from a sample image (search object image) (which will be referred to hereinafter as a sample affine-invariant region) and that the background part is known for a plurality of affine-invariant regions extracted from model images as a source of a search database (which will be referred to hereinafter as model affine-invariant regions).

Since the background part is different among the model affine-invariant regions, we cannot uniformly handle evaluation of similarity with the sample affine-invariant region for all the model affine-invariant regions. For this reason, it is necessary to perform one-to-one evaluation of similarity of the sample affine-invariant region with all the model affine-invariant regions. This operation linearly increases computational complexity against the number of models, and is thus fatal to real-time applications handling a large number of models.

Then the present embodiment uses pixel values of the affine-invariant regions as indices of comparison and alternately performs selection of an optimal interest pixel for refinement of a model affine-invariant region corresponding to the sample affine-invariant region, and actual refinement, while excluding a model whose selected pixel is in the background part, from targets of refinement in the operation, whereby the present embodiment realizes correspondence calculation fast and robust without influence of the background even in the case where the number of models is large.

Figure 2:
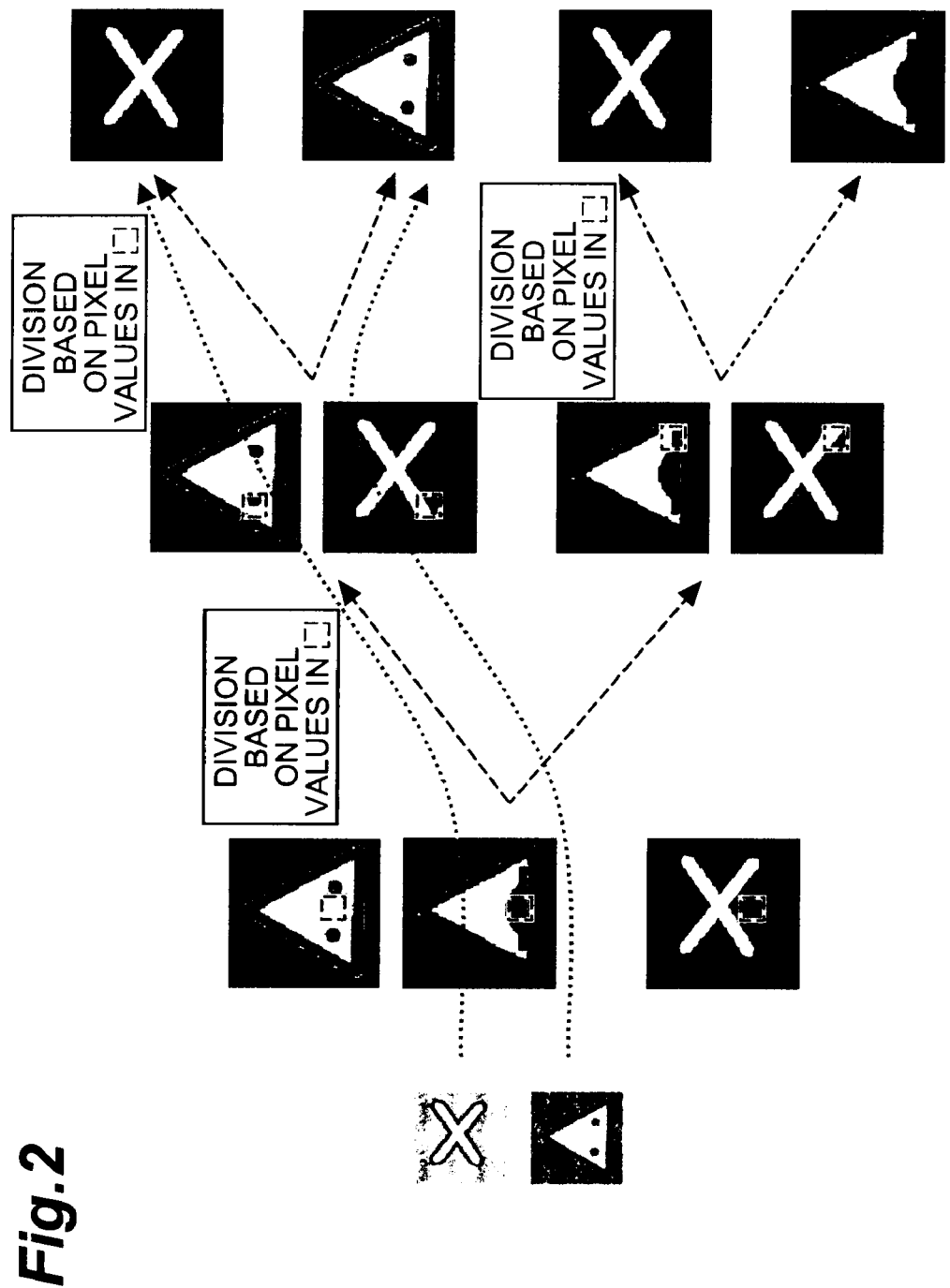
FIG. 2 is an explanatory drawing showing a schematic process of searching in the image search method and apparatus of the present invention.

FIGS. 1 and 2 show conceptual drawings of the present invention.

FIG. 1 shows construction of a database as a basis of comparison when an object image is given. In this example there are three model affine-invariant regions (affine-invariant regions normalized and extracted from model images) as a source of a database as shown on the upper left in the drawing. It is noted that a practical affine-invariant region is not always an entire sign, but, for convenience' sake of description, the model affine-invariant regions in the drawing are the whole regions of a road sign indicating a level difference, a road sign indicating a signal, and a road sign of mark X. In this case, the background part except for the signs is preliminarily set as a background. First, a specific region (region indicated by □ in the table) is set for each model image (standard region) and three model images (standard regions) are classified under two or more subsets, based on luminance information of the specific region.

However, if the specific region falls in the background in a model image (standard region), the model image must be included in all the classified subsets. This classification step results in constructing two subsets as in the middle column in the drawing. Then another specific region is set at a location different from that of the foregoing, in each subset and the model images (standard regions) are further recursively classified into still more subsets, based on luminance information of the specific region. Finally, this recursive classification step results in constructing a total of four subsets each including one element, as in the right column in the drawing.

A tree-shaped database is constructed in this manner and, when a search object image is inputted based on this database, it is determined with which model image the search object image coincides. FIG. 2 is a drawing showing an example of the search. The two images on the leftmost in FIG. 2 are examples (two types) of sample affine-invariant regions extracted from a search object image (affine-invariant regions normalized and extracted from the object image). The search object image also contains the background in addition to the road signs. A specific region (region indicated by □ in the table) is set in each object image (standard region) according to the database and to which subset each object image belongs is sequentially determined (branching determination), based on luminance information of the specific region.

However, since the object image has the background as described above, when the specific region is in the background, the determination on belonging to which subset (branching determination) is made based on the luminance information of the background. Nevertheless, this poses no problem because the construction of the database was based on the following rule: if the specific region in the model image is in the background, the standard region must be included in all subordinate subsets.

Figure 3:
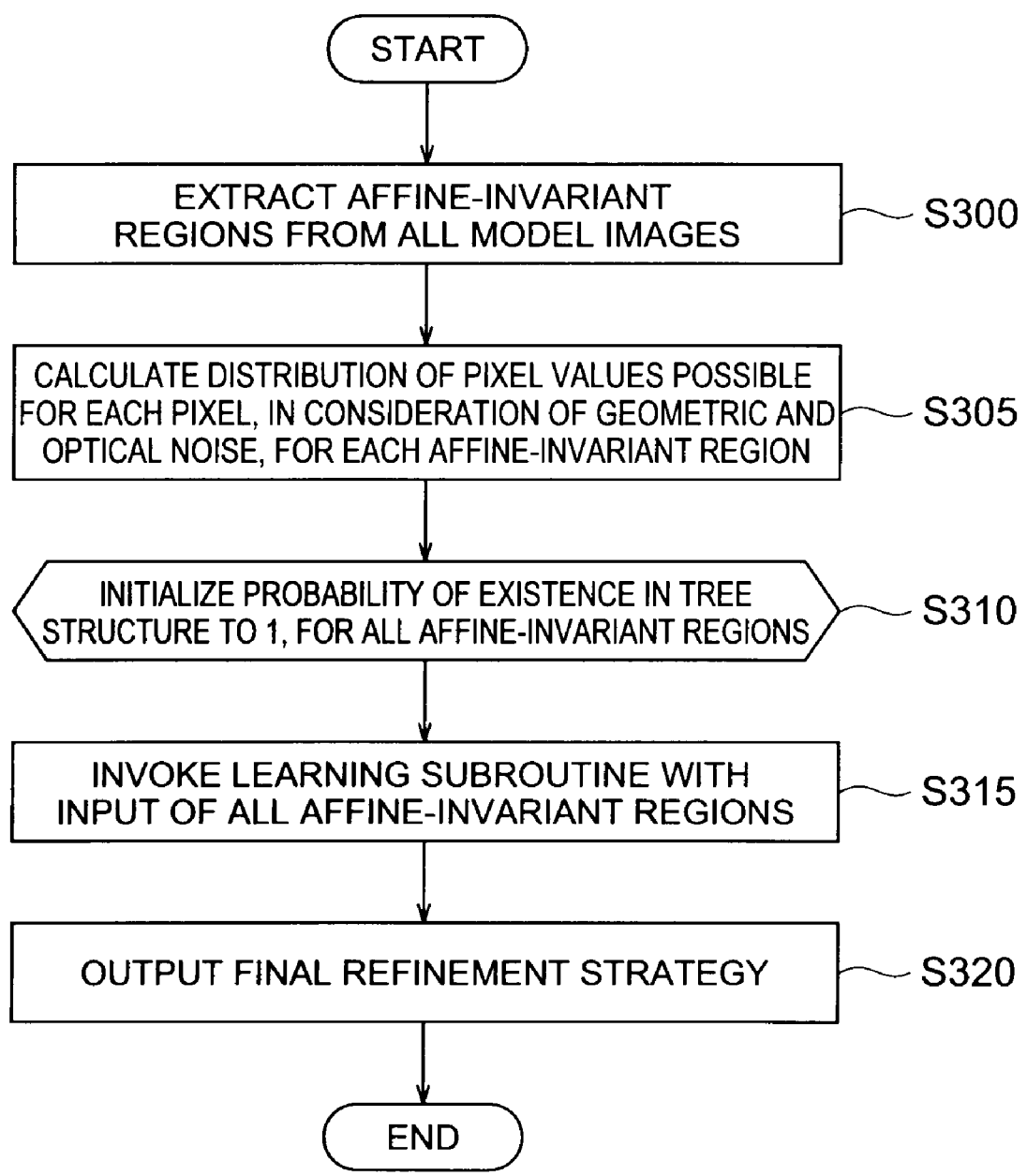
FIG. 3 is a flowchart showing an overall flow in the image search method and apparatus of the present invention.

The method will be described below based on a flowchart. FIG. 3 is the flowchart showing the entire flow. The first step 300 is to extract regions possessing such a property that a shape can be normalized regardless of affine transformation (or rotation transformation), from a plurality of model images whose background region is known, and to normalize each region into a rectangle (or a circle or the like) of fixed size (referred to as a standard region). This processing can be implemented by a plurality of well-known techniques. The number of normalized regions extracted herein is defined as N, and the set thereof as $S=\{s_1, s_2, \ldots, s_N\}$. If the feature region extraction and the normalization are carried out by combination of a plurality of techniques or parameters, the processing of step 305 and subsequent steps is carried out independently for each of the respective techniques or parameters.

The next step 305 is to examine a pixel value v at a pixel location x for $\forall A \in S$. The sample affine-invariant region corresponding to A contains some noise and does not perfectly coincide with A. For a robust correspondence search, it is necessary to model the pixel value v at the pixel location x as a probability function $p_{x,A}(v)$ in consideration of influence of the noise. Consideration is given herein to influence of geometric deviation on the occasion of extraction of the affine-invariant regions, and optical deviation.

Figure 4:
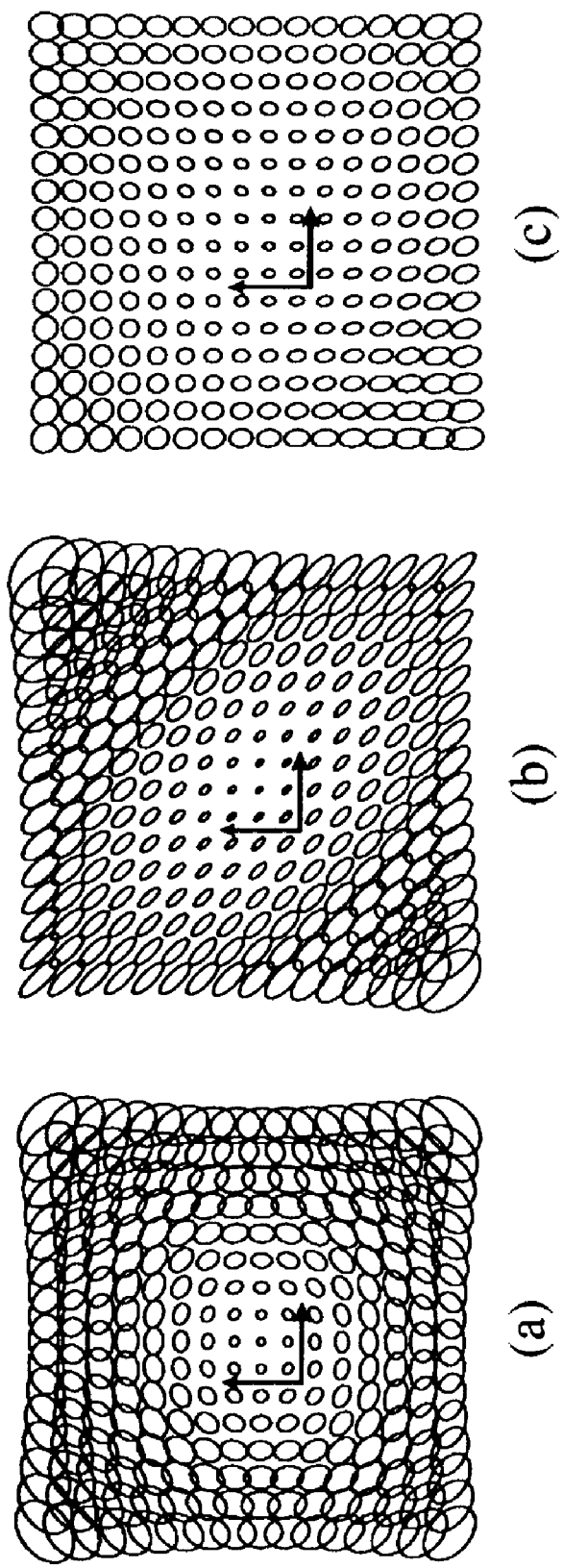
FIG. 4 is an explanatory drawing schematically showing geometric deviation in extraction of an affine-invariant region.

The cause of the geometric deviation is error in an affine transformation matrix for normalization due to image quantization loss or other factors on the occasion of extraction of the affine-invariant regions. Supposing geometric deviation amounts for respective pixels follow a two-dimensional Gaussian distribution, a probability distribution thereof can be expressed as a covariance matrix and can be experimentally calculated by making use of a plurality of image pairs whose H matrix is known. FIG. 4 schematically shows probability distributions of geometric deviation where an affine-invariant region is extracted by respective techniques in [Non-patent Document 2] described above. In the drawing (a) shows a case of the technique based on the region covariance matrix, (b) a case of the technique based on bi-tangent, and (c) a case of the technique based on concavity. Directions and magnitudes of ellipses indicate directions and magnitudes of deviations.

The probability $p_{x,A}(v)$ of observing the pixel value v at the pixel location x of A is represented by the following equation using $l_x$ as a probability distribution of geometric deviation at the pixel location x and a region $\Omega_{v,A}$ in A where the pixel value is v.

$$p_{x,A}(v)=\int_{\Omega_{v,A}} l_x d\Omega \qquad \text{[Mathematical Expression 1]}$$

Figure 5:
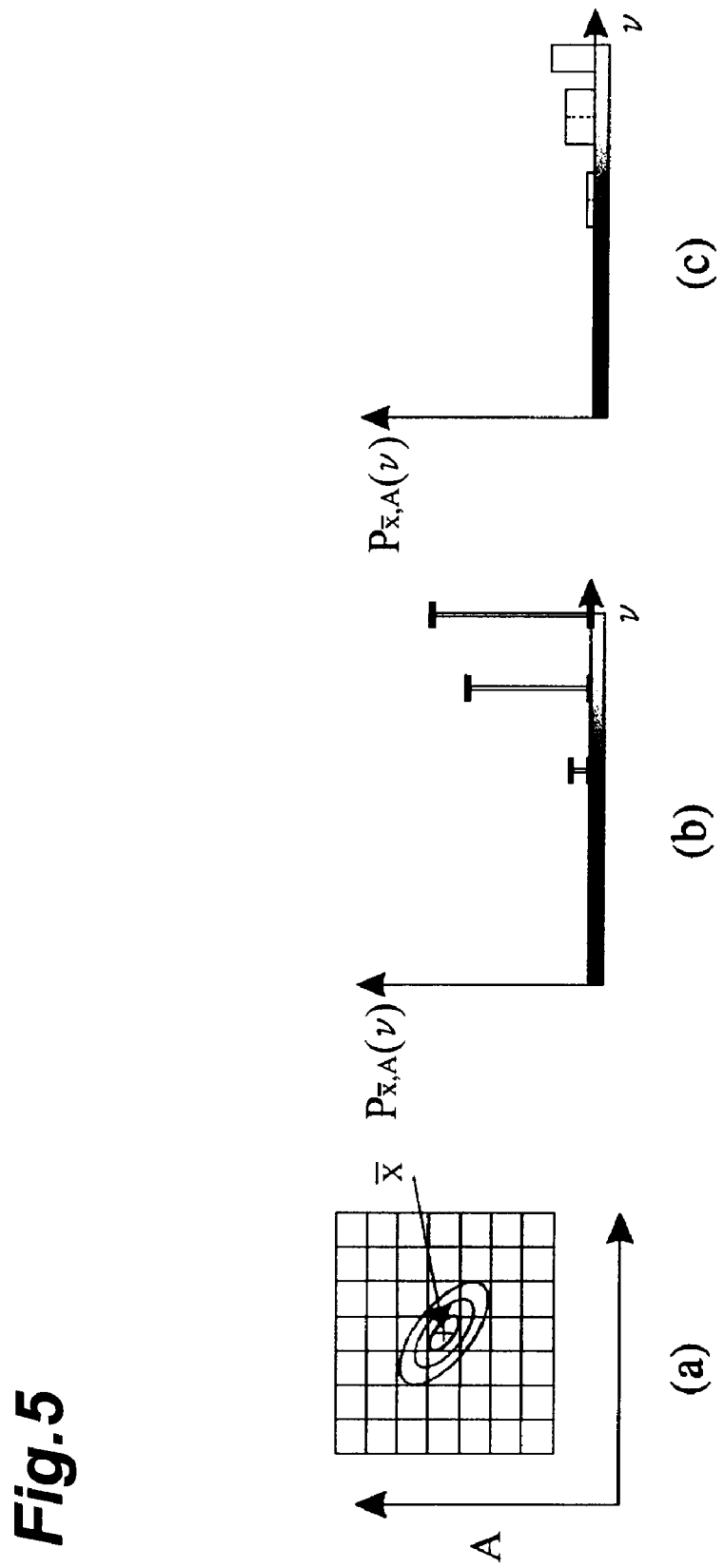
FIG. 5 is an explanatory drawing schematically showing modeling of geometric deviation in extraction of an affine-invariant region.

FIG. 5 includes (a) and (b) schematically showing modeling of geometric deviation. In FIGS. 5 (a) and (b) show distributions of probability $p_{x,A}(v)$, wherein (a) shows the geometric deviation $l_x$ estimated for the pixel location x and (b) the probability $p_{x,A}(v)$ for the pixel value v. In FIG. 5 (c) shows a case further taking account of optical deviation in comparison with (b).

The optical deviation arises from the following factor: optical characteristics do not match between the model affine-invariant regions and the sample affine-invariant regions due to the difference of photographing conditions. When it is assumed that for an observed pixel value v, experimental pixel values are uniformly distributed in [v−ε, v+ε], a probability of observing the pixel value v at the pixel location x is given by $p_{x,A}(v)/2\epsilon$, as shown in FIG. 5 (c).

The next step 310 is to initialize a probability $p_A$ that A exists in branches of the tree structure (repeated subset structure), to 1, for $\forall A \in S$. The next step 315 is to invoke a subroutine of FIG. 6, with input of S and $p_A$. After step 315, step 320 is to output the location of the selected interest pixel and threshold of the pixel value for branching determination, as a correspondence candidate refinement strategy.

Figure 6:
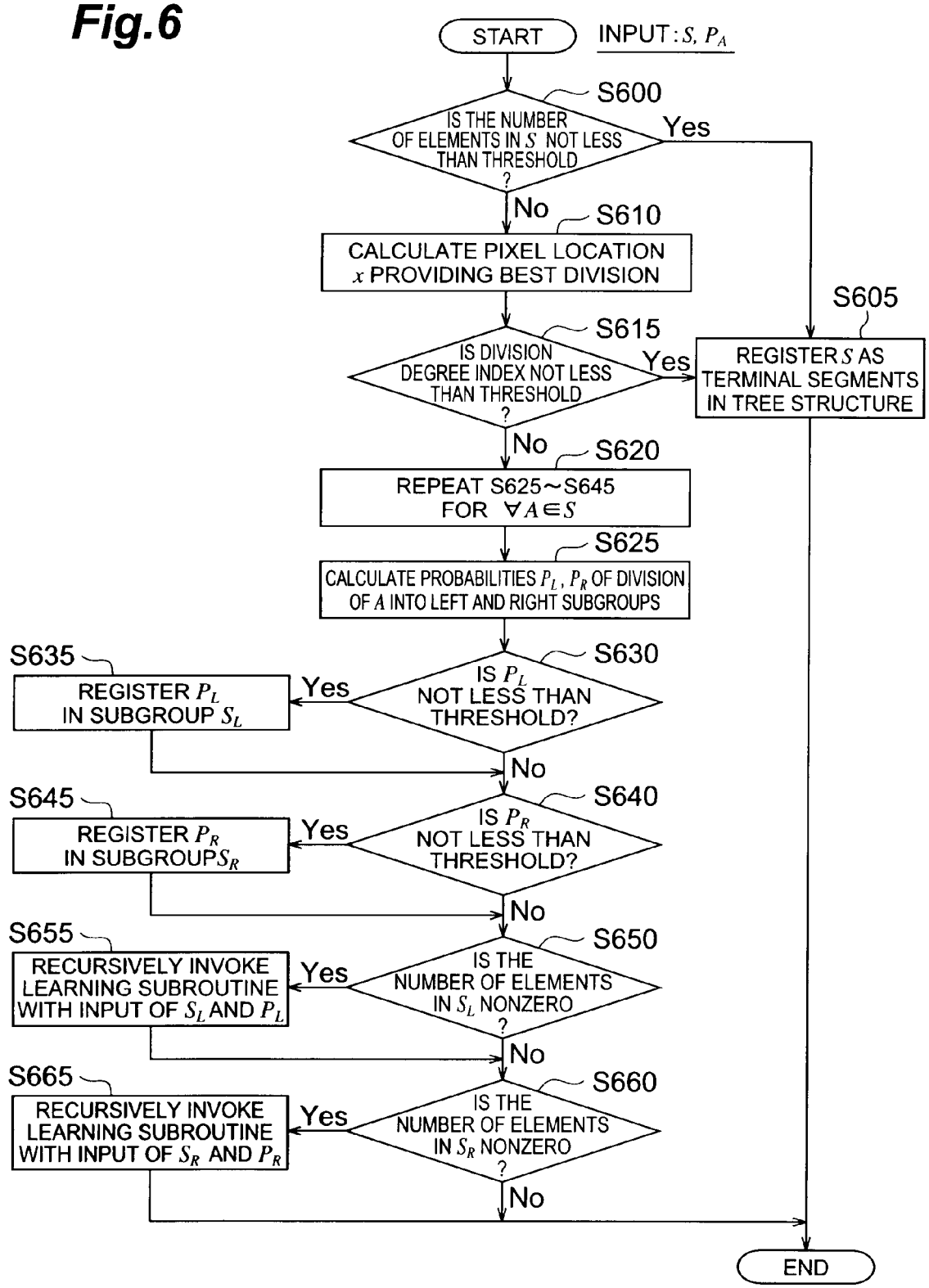
FIG. 6 is a flowchart showing a learning subroutine in the image search method and apparatus of the present invention.

Now let us describe the flowchart of the subroutine of FIG. 6. Learning is started with input of the set S of affine-invariant regions as learning objects and the existence probability $p_A$ for $A \in S$. First, when in step 600 the number of elements in S is not more than the threshold, it is determined that there is no need for further division and the flow goes to step 605. In step 605, it is impossible to implement further division into subsets, and thus the input set S of affine-invariant regions is determined to be distal segments of the tree structure as it is.

On the other hand, when step 600 is negated, i.e., when the number of elements in S exceeds the threshold, the flow goes to step 610 to note a pixel location x in S and consider division into two subsets $S_L$, $S_R$ by a threshold $\theta_x$ of pixel value. If $\theta_x$ is defined as a median of pixel value distribution at the pixel location x, the number of elements in $S_L$ is equal to the number of elements in $S_R$, and the depth of the tree structure becomes minimum. In this strategy, $\theta_x$ is given by the following equation (provided that the pixel values are 256 levels of 0-255).

$$\sum_{A \in S_{input}} p_A \int_0^{\theta_x} p_{x,A}(v)\,dv = \sum_{A \in S_{input}} p_A \int_{\theta_x}^{255} p_{x,A}(v)\,dv \qquad \text{[Mathematical Expression 2]}$$

Furthermore, a division degree $d_x$ is adopted as an index for indicating whether division is good or bad in the case of the subgroup division at the pixel location x. The division degree $d_x$ is calculated according to the equation below. The division degree $d_x$ is 0 in the perfect division case, and is 0.5 in the worst case.

$$d_x = \sum_{A \in S} \min \begin{pmatrix} p_A \int_0^{\theta_x} p_{x,A}(v)\,dv, \\ p_A \int_{\theta_x}^{255} p_{x,A}(v)\,dv \end{pmatrix} \quad \text{[Mathematical Expression 3]}$$

Therefore, the pixel location $x_{bar}$ giving the best division is given by the equation below.

$$\bar{x} = \arg\min_x d_x \quad \text{[Mathematical Expression 4]}$$

In step 615, if $d_{xbar}$ is not less than a threshold, the division into subsets $S_L$, $S_R$ is determined to be impossible and the flow goes to step 605; otherwise, the flow goes to step 620. In step 605, since it is impossible to implement further division into subsets $S_L$, $S_R$, the input set S of affine-invariant regions is determined to be distal segments of the tree structure as it is. In step 620, steps 625-645 below are repeated for all A∈S.

Step 625 is to determine probabilities $p_L$, $p_R$ of dividing A into respective subsets $S_L$, $S_R$, according to the following equations. It is apparent herein that $p_A = p_L + p_R$.

$$p_L = p_A \int_0^{\theta_x} p_{x,A}(v)\,dv\,d_x \quad \text{[Mathematical Expression 5]}$$
$$p_R = p_A \int_{\theta_x}^{255} p_{x,A}(v)\,dv\,d_x$$

Step 630 is to determine whether $p_L$ is not less than a predetermined threshold; if it is not less than the threshold, step 635 is performed to register A in the subset $S_L$ (or to add the subgroup existence probability $p_L$ corresponding to A, into the subset $S_L$). When step 630 is negated (or after step 635), step 640 is performed to determine whether $p_R$ is not less than a predetermined threshold; if it is not less than the threshold, step 645 is performed to register A in the subset $S_R$ (or to add the subgroup existence probability $p_R$ corresponding to A, into the subset $S_R$). Step 620 implements the division into the subsets $S_L$, $S_R$ for all A∈S.

Thereafter, when step 640 is negated (or after step 645), step 650 is performed to determine whether the number of elements in the subset $S_L$ is nonzero. When the number of elements in the subset $S_L$ is nonzero, step 655 is performed to recursively invoke the learning subroutine with input of the subset $S_L$ and probability $p_L$ (to perform subordinate branching). When step 650 is negated (or after step 655), step 660 is performed to determine whether the number of elements in the subset $S_R$ is nonzero. When the number of elements in the subset $S_R$ is nonzero, step 665 is performed to recursively invoke the learning subroutine with input of the subset $S_R$ and probability $p_R$ (to perform subordinate branching).

Figure 7:
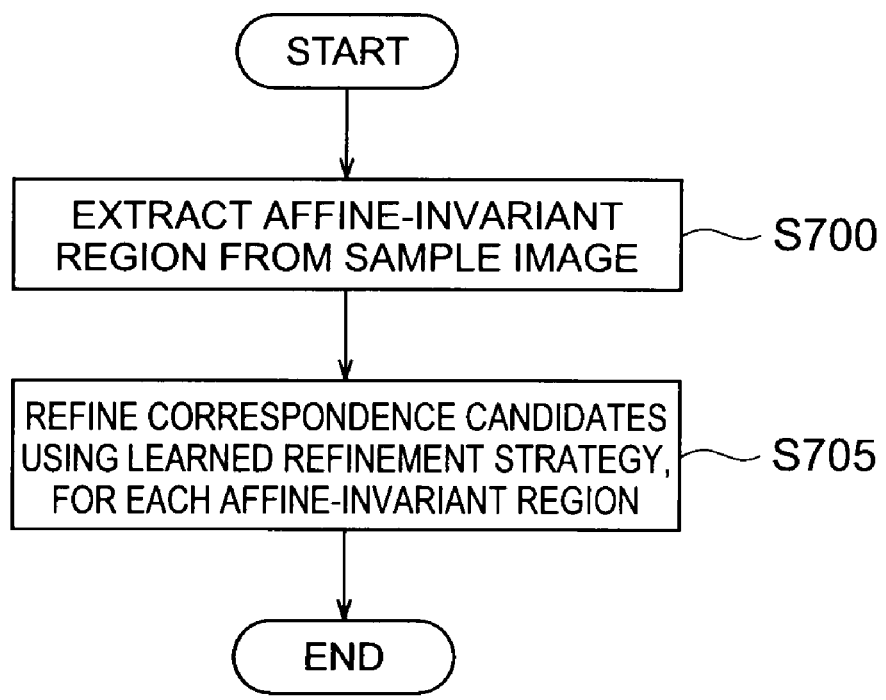
FIG. 7 is a flowchart showing a search in the image search method and apparatus of the present invention.
Figure 8:
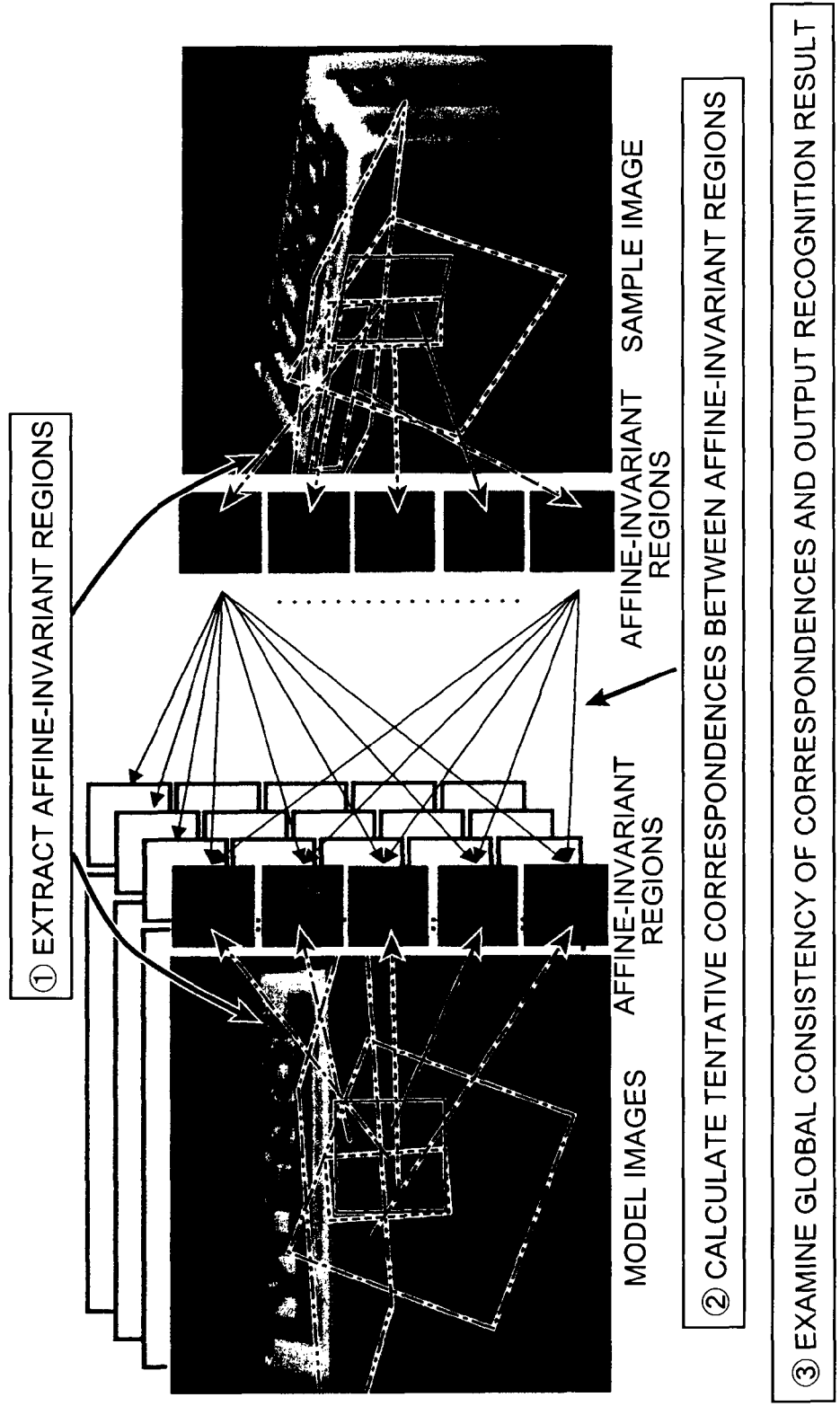
FIG. 8 is an explanatory drawing showing a state in which local regions in images are extracted in an invariant state to affine transformation and rotation transformation.
Figure 9:
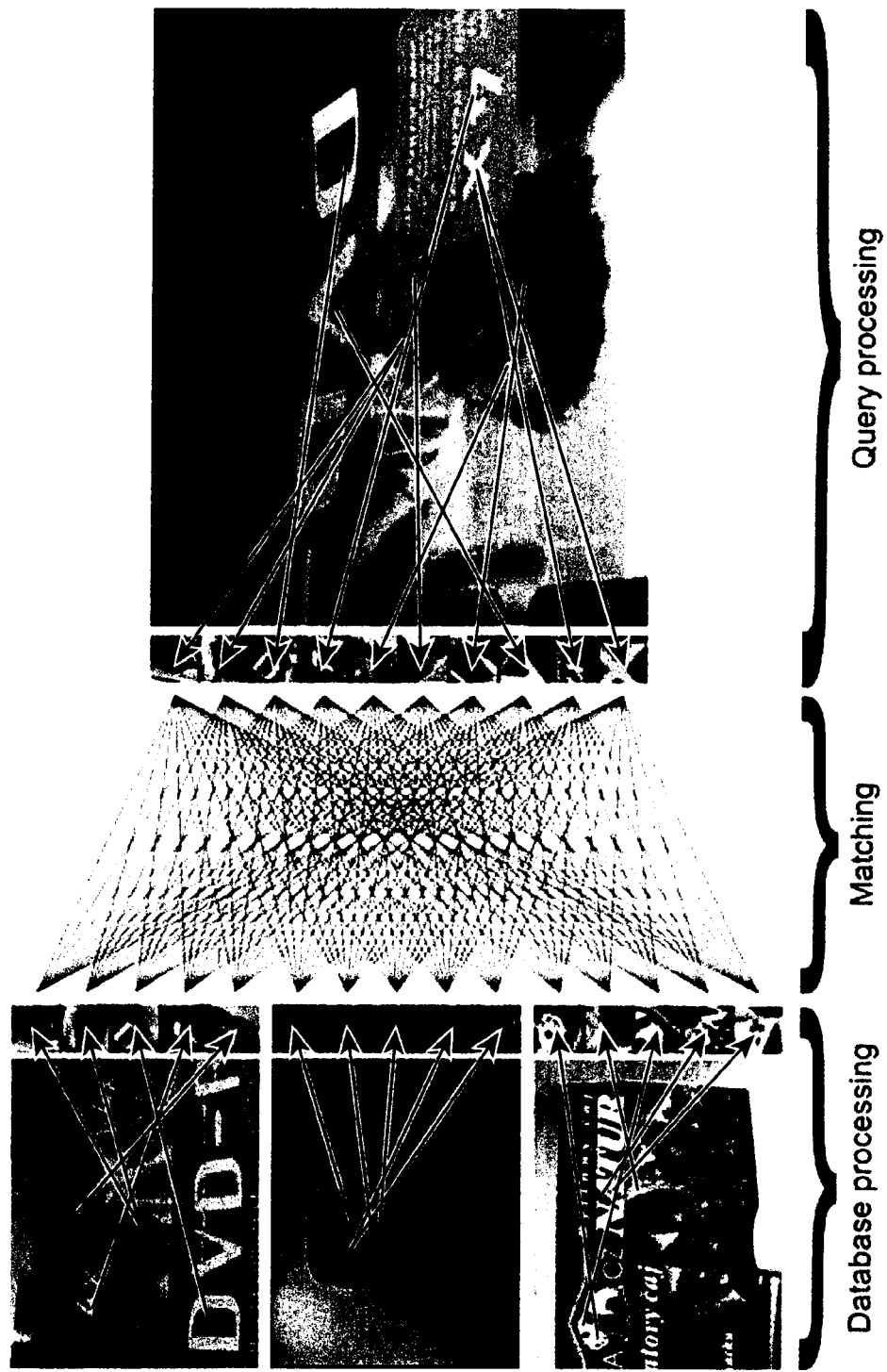
FIG. 9 is an explanatory drawing showing matching between extracted local images.

Next, let us describe the flow of implementing the actual refinement of correspondence candidates (collation between the search object image and the database constructed by learning) in step 705, based on the flowchart of FIG. 7. Step 700 is to extract a plurality of affine-invariant regions (standard regions) from a sample image. This can be implemented by a technique equivalent to step 300 in the flowchart of FIG. 3 for learning. The next step is to calculate correspondence candidates with the use of the learned refinement strategy (database), for each affine-invariant region (standard region) extracted from the search object image. In practice, the selection of the interest image (selection of the specific region) according to the refinement strategy and the branching selection using the comparison between pixel value and threshold are repeated down to the distal segments of the tree structure. This implements matching between the standard regions of the model images and the standard regions of the search object image.

Industrial Applicability

Since the image search method or image search apparatus of the present invention involves the repeated classifications of the model images into the subsets on the basis of the specific region in the standard regions, it is thus able to construct the image database permitting the robust and fast search. When an object image is given as a search object, the foregoing database is used to perform the robust and fast search, using the specific region in the standard region in the object image.

The invention claimed is:

1. An image search method implemented using an image searching apparatus having a processor, comprising:
   a normalization step of extracting a plurality of regions from one or more model images and normalizing the regions as extracted regions;
   a classification step of setting, using the image searching apparatus, a first specific region within each normalized extracted region and classifying the plurality of extracted regions under two or more first subsets on the basis of a feature of the first specific region;
   a recursive classification step of iteratively performing, using the image searching apparatus, an operation of setting a second specific region different from that of said first specific region in each extracted region classified in each first subset and classifying the plurality of extracted regions under second subsets on the basis of a feature of the second specific region, the second subsets having a hierarchical relationship to the first subsets, each first specific region encompassing a first portion of a respective one of the extracted regions and each second specific region encompassing a second portion of the respective one of the extracted regions, the first portion including an area not included in the second portion, and the second portion including an area not included in the first portion; and
   an output step of outputting the locations of the first and second specific regions in the extracted regions in the respective classifications and the features of the first and second specific regions in the respective classifications.

2. The image search method according to claim 1, wherein the features of the first and second specific regions used in the respective classifications are luminance information about the first and second specific regions.

3. The image search method according to claim 1, wherein the normalization step comprises dividing each extracted region into a background part and a search part, and wherein when a location of the first or second specific region in the classification step or in the recursive classification step is in the background part, the first or second specific region is included in all the subsets in the respective classification.

4. The image search method according to claim 1, wherein the normalization step comprises normalizing a region possessing such a property that a shape can be normalized regardless of an affine transformation thereof, as one of the extracted regions.

5. The image search method according to claim 1, wherein the normalization step comprises normalizing a region possessing such a property that a shape can be normalized regardless of a rotation transformation thereof, as one of the extracted regions.

6. The image search method according to claim 1, further comprising:
   an input step of inputting a predetermined region resulting from normalization of a region extracted from a search object, as a detection object; and
   a search step of performing a search to determine to which terminal subset the predetermined region belongs, based on an output result in the output step, and thereby finding a correspondence between the predetermined region and one of the subsets of the extracted regions.

7. The image search method according to claim 6, wherein the search step comprises finding the correspondence between the predetermined region and one of the subsets of the extracted regions, in consideration of a location deviation from the extracted regions in the normalization for the predetermined region in the input step.

8. The image search method according to claim 1, wherein each first specific region is smaller than a respective one of the normalized extracted regions.

9. An image search apparatus comprising:
   normalization means for extracting a plurality of regions from one or more model images and normalizing the regions as extracted regions;
   classification means for setting a first specific region within each normalized extracted region and classifying the plurality of extracted regions under two or more first subsets on the basis of a feature of the first specific region;
   recursive classification means for iteratively performing an operation of setting a second specific region different from that of said first specific region in each extracted region classified in each first subset and classifying the plurality of extracted regions under second subsets on the basis of a feature of the second specific region, the second subsets having a hierarchical relationship to the first subsets, each first specific region encompassing a first portion of a respective one of the extracted regions and each second specific region encompassing a second portion of the respective one of the extracted regions, the first portion including an area not included in the second portion, and the second portion including an area not included in the first portion; and
   output means for outputting the locations of the first and second specific regions in the extracted regions in the respective classifications and the features of the first and second specific regions in the respective classifications.

10. The image search apparatus according to claim 9, wherein the features of the first and second specific regions used in the respective classifications are luminance information about the first and second specific regions.

11. The image search apparatus according to claim 9, wherein the normalization means divides each extracted region into a background part and a search part, and wherein when a location of the first or second specific region in the classification by the classification means or in the recursive classification by the recursive classification means is in the background part, the first or second specific region is included in all the subsets in the respective classification.

12. The image search apparatus according to claim 9, wherein in the normalization by the normalization means a region possessing such a property that a shape can be normalized regardless of an affine transformation thereof, is normalized as one of the extracted regions.

13. The image search apparatus according to claim 9, wherein in the normalization by the normalization means a region possessing such a property that a shape can be normalized regardless of a rotation transformation thereof, is normalized as one of the extracted regions.

14. The image search apparatus according to claim 9, further comprising:
   input means for inputting a predetermined region resulting from normalization of a region extracted from a search object, as a detection object; and
   search means for performing a search to determine to which terminal subset the predetermined region belongs, based on an output result by the output means, and thereby finding a correspondence between the predetermined region and one of the subsets of the extracted regions.

15. The image search apparatus according to claim 14, wherein in the search by the search means the correspondence between the predetermined region and one of the subsets of the extracted regions is found in consideration of a location deviation from the extracted regions in the normalization for the predetermined region in the input step.

16. An image search apparatus comprising:
   a normalization unit that extracts a plurality of regions from one or more model images and normalizes the regions as extracted regions;
   a classification unit that sets a first specific region within each normalized extracted region and classifying the plurality of extracted regions under two or more first subsets on the basis of a feature of the first specific region;
   a recursive classification unit that iteratively performs an operation of setting a second specific region different from that of said first specific region in each extracted region classified in each first subset and classifying the plurality of extracted regions under second subsets on the basis of a feature of the second specific region, the second subsets having a hierarchical relationship to the first subsets, each first specific region encompassing a first portion of a respective one of the extracted regions and each second specific region encompassing a second portion of the respective one of the extracted regions, the first portion including an area not included in the second portion, and the second portion including an area not included in the first portion; and
   an output unit that outputs the locations of the first and second specific regions in the extracted regions in the respective classifications and the features of the first and second specific regions in the respective classifications.

* * * * *